United States Patent [19]
Sharangpani

[11] Patent Number: 6,058,410
[45] Date of Patent: *May 2, 2000

[54] METHOD AND APPARATUS FOR SELECTING A ROUNDING MODE FOR A NUMERIC OPERATION

[75] Inventor: Harshvardhan Sharangpani, Santa Clara, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/759,050

[22] Filed: Dec. 2, 1996

[51] Int. Cl.$^7$ ........................................ G06F 7/38
[52] U.S. Cl. ............................. 708/551; 708/550
[58] Field of Search ..................... 364/745, 748, 364/748.03, 745.02, 572, 551, 571, 550

[56] References Cited

U.S. PATENT DOCUMENTS

| | | | |
|---|---|---|---|
| 5,404,324 | 4/1995 | Colon-Bonet | 364/761 |
| 5,548,544 | 8/1996 | Matheny et al. | 364/745 |
| 5,568,412 | 10/1996 | Han et al. | 364/748 |
| 5,612,909 | 3/1997 | Morrow | 364/745 |
| 5,696,709 | 12/1997 | Smith et al. | 364/745.02 |

*Primary Examiner*—Zarni Maung
*Assistant Examiner*—Saleh Najjar
*Attorney, Agent, or Firm*—Blakely, Sokoloff, Taylor & Zafman

[57] ABSTRACT

A processor contains a storage area for a dynamic rounding mode control value, and a circuit coupled to the storage area configured to execute an instruction using a rounding mode. When the instruction is a first predetermined instruction, a first predetermined rounding mode is used during execution of the instruction. When the instruction is not the first predetermined instruction and the rounding mode specified by the instruction is not a dynamic override, the circuit executes the instruction using a rounding mode specified by the instruction. When the instruction is not the first predetermined instruction and the rounding mode specified by the instruction is the dynamic override, the circuit executes the instruction using a rounding mode specified by the dynamic rounding mode control value.

19 Claims, 2 Drawing Sheets

METHOD AND APPARATUS FOR SELECTING A ROUNDING MODE FOR A NUMERIC OPERATION

BACKGROUND

1. Field of the Invention:

The invention relates to the art of numerical processing in a computer system, and rounding during floating point numerical processing in particular.

2. Art Background:

When performing computations in a computer system, it is often necessary to round the results of numeric operations to a certain precision. Rounding occurs routinely in the evaluation of numeric expressions. The rounding mode is used to control the direction and nature of the rounding performed on the results. IEEE Standard 754 specifies four rounding modes which may be employed. They are round to plus infinity, round to minus infinity, round toward zero, and round to nearest value. The round to plus infinity mode causes numbers to be rounded toward positive infinity. The round to minus infinity mode causes numbers to be rounded toward negative infinity. The round toward zero mode causes a number to be rounded toward zero. This is also known as the chop or truncate rounding mode, because it is accomplished by chopping off or truncating the bits of the number to round at the desired precision. The round to nearest (or even) mode rounds the result to the nearest number of the desired precision. When the number is midway between two equally viable results, the round to nearest mode rounds the number to the even result.

The table below shows the results of the various rounding modes on different numbers. The numbers are rounded to the nearest whole number in the table. In general, the rounding may be specified to any precision, not just whole numbers:

TABLE 1

|  | +inf | −inf | to 0 (chop) | nearest (even) |
|---|---|---|---|---|
| 1.11 | 2.0 | 1.0 | 1.0 | 1.0 |
| −1.11 | −1.0 | −2.0 | −1.0 | −1.0 |
| 1.53 | 2.0 | 1.0 | 1.0 | 2.0 |
| −1.53 | −1.0 | −2.0 | −1.0 | −2.0 |
| 2.5 | 3.0 | 2.0 | 2.0 | 2.0 |
| 1.5 | 2.0 | 1.0 | 1.0 | 2.0 |

A common use for rounding modes is during the conversion of floating point numbers to integers. Different programming languages specify different rounding modes in this situation. For example, C language specifies round to zero mode and FORTRAN specifies round to nearest mode as the default mode to use during conversion from the floating point to the integer numeric formats.

Typically, the rounding mode for an operation is specified in one of two ways: static and dynamic. With dynamic rounding control, the rounding mode is specified by the bits of a value in a control register. The control register is typically writeable and readable by software, so that programs can dynamically specify the rounding mode to apply to subsequent numeric operations by writing the control register. The processor interprets the bits of the value in the register and applies the specified rounding mode to all relevant numeric operations. Thus, if the control register was modified to specify the use of round to zero mode, round to zero would be applied to the results of all subsequent numeric operations.

With static rounding control, the rounding mode is coded into a field of the instruction itself. When the processor prepares to execute the instruction, it checks the rounding mode field and applies the specified rounding mode. Thus the rounding mode can be specified on a per-instruction basis without the overhead of writing to a control register.

Some computer systems combine static and dynamic rounding control. Typically, in these systems the instruction contains a field which specifies a certain rounding mode (static rounding control). A control register is also available to specify the rounding mode dynamically. The issue in these systems is which rounding control takes priority, the static or the dynamic.

One solution to the question of priority is to give the static control priority unless the static control specifies a special override value. If the override value is specified, the dynamic rounding control is used. Consider the following encodings for static rounding control:

TABLE 2

| encoding | meaning |
|---|---|
| 000 | +inf |
| 001 | −inf |
| 010 | nearest |
| 011 | to 0 (chop) |
| 1xx | use mode specified by control register (override) |

Some processors, such as certain processors manufactured by the Intel™ Corp., use only dynamic rounding control. The use of only dynamic rounding control can lead to software inefficiencies, especially when using library routines that perform mathematical computations. Library routines are typically designed for linking with a variety of programs, so that they are designed to be highly self-contained. Before calling a library routine, a program linked to the library in a system with dynamic rounding control may configure the control register with a rounding mode, then call the library routine to perform the computations. The processor automatically applies the rounding mode specified in the control register to the numeric operations specified in the library routine.

The problem with this approach is that when a library routine relies upon the calling application to specify the rounding mode, it is possible that the application will specify a mode that is undesireable for the routine, violating the library calling convention and jeapordizing the integrity of the calculations performed in the library. To avoid this problem, many library routines will, upon being invoked, first save the current control register value, set the control register to the desired rounding mode, perform their numerical operations, and then restore the saved value of the control register before returning. The overhead associated with first saving the current value of the control register, setting it to a new value, and then restoring the value before returning makes the library routines less efficient than they might otherwise be. However, it ensures the integrity of the calculation and makes it less susceptible to violations of the calling convention.

To make the library routine more efficient, static rounding controls can be used. Using static rounding controls, each instruction specifies a rounding mode which overrides whatever is in the control register. Because of the override, there is no need for the library routine to store and restore the control register value.

The ALPHA™ family of microprocessors, manufactured by Digital Equipment™ Corp, provide two bits within the instruction for specifying the static rounding control. Two bits allows for the coding of up to four static rounding modes, however, one encoding must be reserved for the dynamic override. The three static modes supported by the ALPHA processors are nearest, round to zero, and round to positive infinity. The ALPHA does not support a static rounding mode for the round to negative infinity mode, because to do so would require a third bit in the encodings (see Table 2). Therefore, library routines which require the round to negative infinity mode must specify dynamic override in their numeric instructions with the control register set to the round to negative infinity mode. Because these routines use the control register to specify the rounding mode, they must incur the overhead associated with saving, setting, and then restoring the control register. The round to negative infinity mode is used for computations which require extra-precise arithmetic, in which a result is rounded to both positive and negative infinity, examined for each case, and the more precise result selected.

To avoid the problems set forth above, it would be desireable to make all four rounding modes available to programs statically, in addition to providing a dynamic override encoding so that the control register value can be used to specify the rounding mode if desired. It would be desireable to accomplish this using only two bits of the instruction for encoding the static rounding mode and dynamic override.

SUMMARY OF THE INVENTION

A processor contains a storage area for a dynamic rounding mode control value, and a circuit coupled to the storage area configured to execute an instruction using a rounding mode. When the instruction is a first predetermined instruction, a first predetermined rounding mode is used during execution of the instruction. When the instruction is not the first predetermined instruction and the rounding mode specified by the instruction is not a dynamic override, the circuit executes the instruction using a rounding mode specified by the instruction. When the instruction is not the first predetermined instruction and the rounding mode specified by the instruction is the dynamic override, the circuit executes the instruction using a rounding mode specified by the dynamic rounding mode control value.

DETAILED DESCRIPTION

In the following description, numerous specific details are set forth such as circuits, flow diagrams, etc, in order to provide a thorough understanding of the present invention. In other instances, well-known structures and techniques have not been shown in detail because to do so would unnecessarily obscure the present invention.

The specific arrangements and methods described herein are merely illustrative of the principles of the present invention. Numerous modifications in form and detail may be made by those of ordinary skill in the art without departing from the scope of the present invention. For example, the dynamic rounding mode control value could be stored in main memory (RAM) or some other location other than within the registers of the processor.

The invention solves the problems associated with the prior art by providing, in one embodiment, static rounding control encodings in the instruction for the round to nearest, round to plus infinity, and round to minus infinity modes. A fourth static encoding specifies dynamic override. In addition, the round to zero mode is supported for the most common application of converting a floating point number to an integer, using a special instruction in which the static rounding mode is ignored, but which implicitly overrides the mode specified by the control register with the round to zero mode.

It is well known in the art that round to zero mode is most frequently used on floating point to integer conversion operations. The invention thus provides a dedicated instruction for convertion floating point numbers to integers which implicitly overrides the rounding mode specified in the control register with the round to zero mode. The instruction is called FTRUNCINT. When the processor encounters the FTRUNCINT instruction, it rounds the floating point number to an integer using the round to zero rounding mode, ignoring any static or dynamic rounding controls.

For additional flexibility in selecting the rounding mode when converting floating point numbers to integers, the invention also provides the FRNDINT instruction. This instruction causes the processor to round a floating point number to an integer value using the rounding mode specified in the static rounding control field of the instruction, and also provides an encoding for dynamic override. Using one of the FTRUNCINT and FRNDINT instructions, a number can be rounded from floating point to integer format using any one of the four IEEE specified rounding modes, without resorting to dynamic override.

Figure 1:
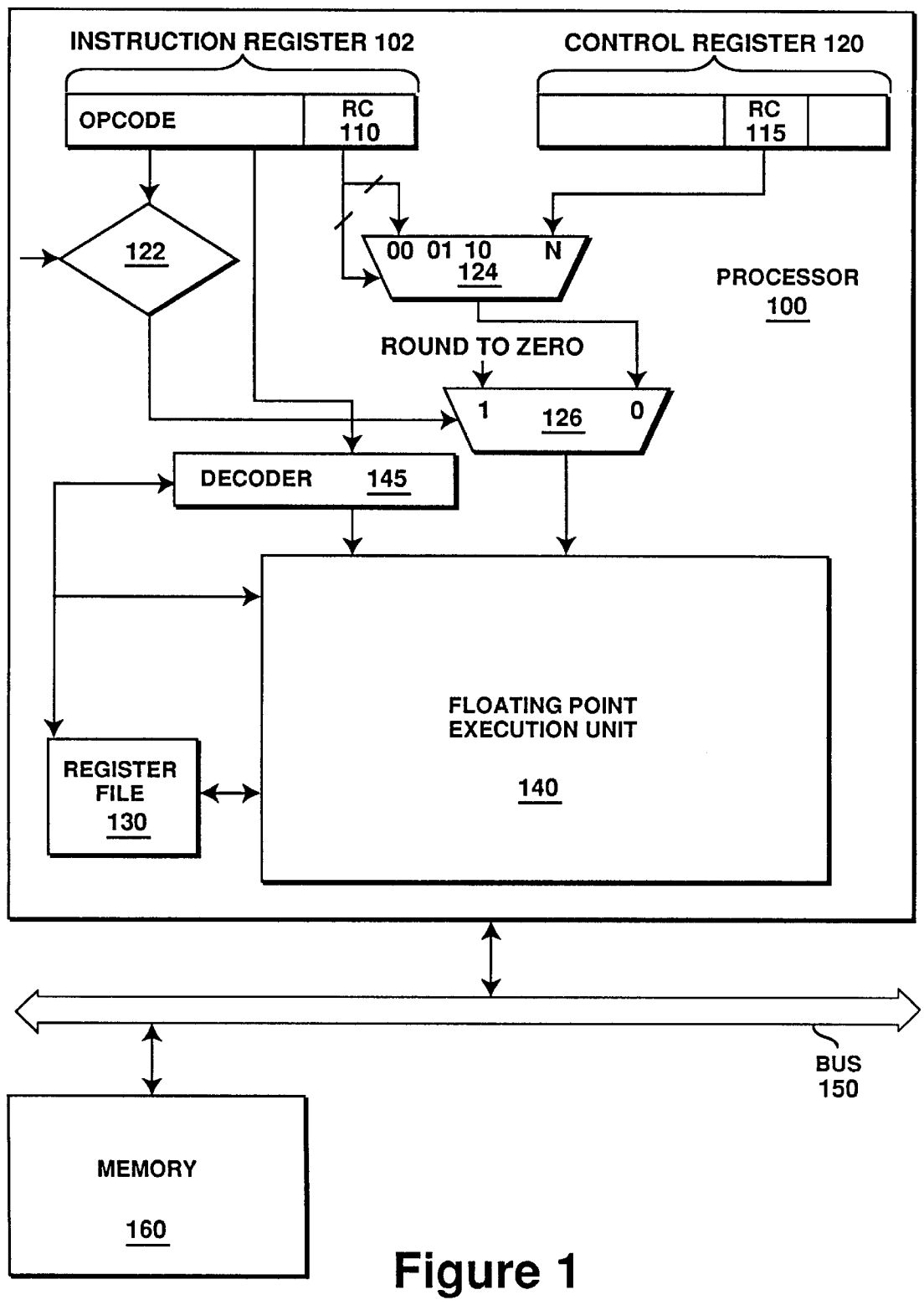
FIG. 1 illustrates a computer system utilizing a processor which selects a rounding mode for an instruction according to the teachings of the invention.

FIG. 1 illustrates a computer system utilizing a processor 100 which selects a rounding mode for an instruction according to the teachings of the invention. In FIG. 1, the processor 100 selects a rounding mode to use from either the static rounding control 110 of the instruction, or else the rounding control 115 specified by the control register 120, or else a predetermined rounding mode when the instruction is a first predetermined instruction FTRUNCINT.

A memory 160 stores instructions and data for execution by the processor. The memory 160 represents one or more mechanisms for storing instructions and data. For example, the memory 160 may include machine-readable mediums such as read only memory (ROM), random access memory (RAM), magnetic disk storage mediums, optical storage mediums, flash memory devices, and/or other machine-readable mediums. The memory 160 is coupled to a processor 100 by way of a bus 150. The bus 150 represents one or more busses (e.g., Peripheral Component Interconnect (PCI) bus, Industry Standard Architecture (ISA) bus, X-Bus, Extended Industry Standard Architecture (EISA) bus, Video Electronics Standard Association (VESA) bus, optical coupling, etc.) and bridges (also termed as bus controllers). The processor 100 represents a central processing unit of any type of architecture, such as as Complex Instruction Set Computer (CISC), Reduced Instruction Set Computer (RISC), Very Long Instruction Word (VLIW), or a hybrid architecture. In addition, the processor 100 could be implemented on one or more chips.

Using the bus 150, the processor 100 accesses the various elements stored in the memory 160. The processor 100 contains a decoder 145 for decoding the instructions, a register file 130 for storing the operands and results of executing the instructions, and an execution unit 140 for executing instructions. Of course, the processor 100 contains additional circuitry which is not necessary to understanding the invention. The decoder 145 is coupled to the bus 150, and the register file 130 is coupled to the decoder 145. The execution unit 140 is coupled to decoder 145 and the register file 130. In many cases, the operands of instructions decoded by the decoder 145 are made available to the execution unit 140 via the register file 130. The register file 130 contains data registers to store arguments for the received instructions. The register file 130 may contain status registers, control registers, and address registers for controlling the execution of the recieved instructions. The decoder may be implemented using hard-wired circuitry, a Programmable-Gate-Array, a microcoded ROM, or by any other method known in the art. While this embodiment is described in relation to a single processor computer system, the invention could be implemented in a multi-processor computer system. The output of the decoder 145 is input to the execution unit 140 and represents the decoded instruction and identifies operands for use when executing the instruction.

The processor 100 is comprised of an instruction register 102 containing an instruction and a control register 120 containing a dynamic rounding mode control value with a rounding control field 115. Of course, the processor 100 contains additional circuitry not shown so as not to obscure the present invention.

The processor 100 contains one embodiment of the invention for selecting a rounding mode to use for a numeric operation. In the illustrated embodiment, the rounding mode is selected using two multiplexers 124, 126 and comparison logic 122. The opcode 105 from the instruction in the instruction register 102 is input to comparison logic 122 and decoder 145. Comparison logic 122 compares the opcode 105 of the instruction and the opcode of the FTRUNCINT instruction. If the two opcodes are equal, comparison logic 122 asserts its output coupled to multiplexer 126, which acts as a select signal as explained further below.

The static rounding control field 110 of the instruction is provided to the multiplexer 124 as a selectable input. It is also provided to the select input of the multiplexer 124. In this manner, the encodings corresponding to the static rounding control values are used to select themselves to the output of the multiplexer 124. If the static rounding control field 110 specifies dynamic override, then the the dynamic rounding control mode field 115 is selected to the output of the multiplexer 124. The dynamic rounding control mode field 115 is input to multiplexer 124 from control register 120. To reiterate, the multiplexer 124 selects one of the inputs containing the static rounding control mode value 110 or else the dynamic rounding control mode value 115 to its output, the output becoming an input to secondstage multiplexer 126.

The output of multiplexer 124 (representing a selection of either the static rounding control value 110 or else the dynamic rounding control value 115) is input to multiplexer 126, along with a first predetermined rounding control value. In this case the predetermined rounding control value defines the round to zero rounding mode. As previously explained, the output of comparison logic 122 is provided as the select input of multiplexer 126. When the comparison of the opcode of the instruction with FTRUNCINT was TRUE, the output of the comparison logic 122 is asserted and the predetermined round to zero mode control value is selected to the output of multiplexer 126. Otherwise, the output of multiplexer 124 representing either the static rounding control mode value 110 or else the dynamic rounding control mode value 115 is selected to the output of multiplexer 126. The output of multiplexer 126 becomes the selected rounding control mode used by the execution unit 140 when performing the numeric operation specified by the instruction in the instruction register 102.

As the figure demonstrates, all four rounding modes are available to programs statically. Three static rounding modes may be statically encoded into the instruction. If the fourth static rounding mode is desired (virtually always when converting floating point numbers to integers), a special instruction is available for that purpose. In addition, the invention provides a dynamic override encoding in the instructions so that the control register value can be used to specify the rounding mode, if desired. Only two bits of the instruction are required for encoding the static rounding mode and dynamic override.

Other embodiments are possible without departing from the scope of the invention. For example, the dynamic rounding mode control value 115 need not be stored in a control register 120 in the register file 130. Instead, it could be stored in memory 160 or elsewhere in the computer system and accessed by way of the bus 150. Also, other means of selecting the rounding mode may be employed instead of the two multiplexers 124, 126. For example, a table-lookup could be used to select the rounding mode to use based upon inputs from the control and instruction registers 120, 102.

The invention improves prior art methods of selecting a rounding control for an operation by allowing for static rounding mode control for all four of the IEEE rounding modes, with a provision for dynamic override, using only two bits in the instruction.

Figure 2:
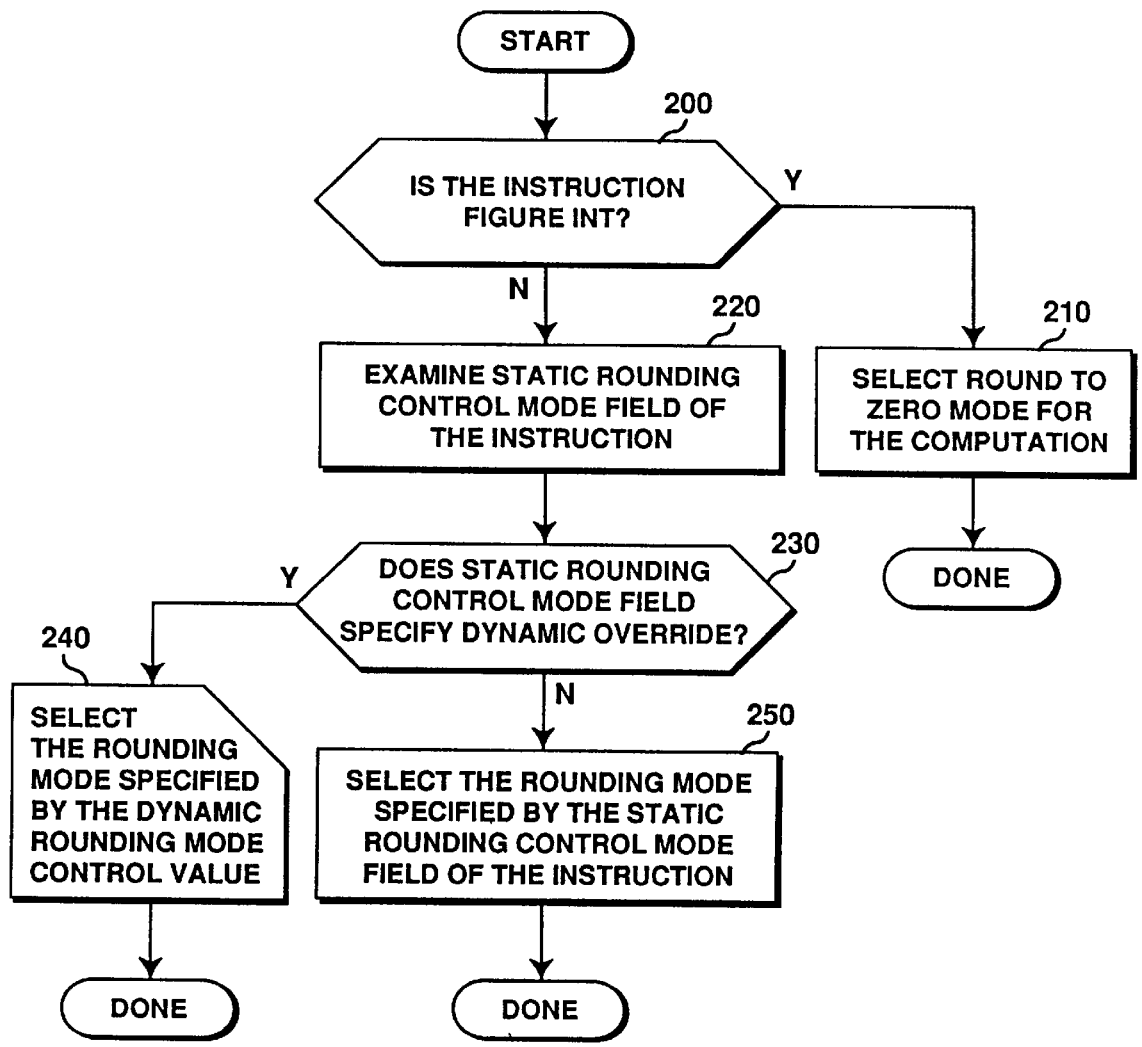
FIG. 2 illustrates a method for selecting a rounding mode control to use for an instruction.

FIG. 2 illustrates a method for selecting a rounding mode control to use for an instruction. At step 200 a check is made to determine whether or not the instruction to execute is the FTRUNCINT instruction. If the instructionis FTRUNCINT, then a predetermined rounding mode of round to zero is selected for the computation (conversion from floating point to integer, for example) at step 210. If the instruction is not FTRUNCINT, then the static rounding mode control field of the instruction is examined at step 220. After examining the static rounding control mode field, the next step is determining whether the static rounding control mode field specifies dynamic override. If dynamic override is specified by the static rounding mode control field, the rounding mode specified by the dynamic rounding mode control value is selected at step 240. If dynamic override is not specified by the static rounding mode control field, then the rounding mode specified by the static rounding control mode field of the instruction is selected at step 250.

Other embodiments are possible without departing from the scope of the invention. For example, steps 200 and 210 could be performed last, so that the method first selects the rounding mode specified by either the static or dynamic control values, and then overrides the selection with the predetermined rounding mode when the instruction is FTRUNCINT.

Although this invention has been shown in relation to a particular embodiment, it should not be considered so limited. Rather, the invention is limited only by the scope of the appended claims.

What is claimed is:

1. A processor for use in a computer system comprising:
   a storage area capable of containing a dynamic rounding mode control value; and
   a circuit coupled to said storage area, configured to execute an instruction using a first predetermined rounding mode when the instruction is a first dedicated instruction, said circuit further configured to execute the instruction using a rounding mode specified by a two-bit field of the instruction when the instruction is not the first dedicated instruction and the rounding mode specified by the two-bit field of the instruction is not a dynamic override, said circuit further configured to execute the instruction using a rounding mode specified by the dynamic rounding mode control value when the instruction is not the first dedicated instruction and the rounding mode specified by the two-bit field of the instruction is the dynamic override.

2. The processor of claim 1 in which the first dedicated instruction is an instruction to round a floating point number to integer format.

3. The processor of claim 1, wherein the first dedicated instruction indicates round a number to plus infinity.

4. The processor of claim 1, wherein the first dedicated instruction indicates round a number to minus infinity.

5. The processor of claim 1, wherein the first dedicated instruction indicates round a number to nearest.

6. The processor of claim 1, wherein the two-bit field of the instruction indicates either round to nearest, round to plus infinity, dynamic rounding mode, or round to minus infinity.

7. The processor of claim 1, wherein the two-bit field of the instruction indicates either round to nearest, round to plus infinity, dynamic rounding mode, or round to zero.

8. The processor of claim 1, wherein the two-bit field of the instruction indicates either round to nearest, round to zero, dynamic rounding mode, or round to minus infinity.

9. The processor of claim 1, wherein the two-bit field of the instruction indicates either round to zero, round to plus infinity, dynamic rounding mode, or round to minus infinity.

10. A processor for use in a computer system comprising:

storage means capable of containing a dynamic rounding mode control value; and execution means, coupled to said storage means, configured for execution an instruction using a first predetermined rounding mode when the instruction is a first dedicated instruction, said execution means further configured to execute the instruction using a rounding mode specified by a two-bit field of the instruction when the instruction is not the first dedicated instruction and the rounding mode specified by the two-bit field of the instruction is not a dynamic override, said execution means further configured for executing the instruction using a rounding mode specified by the dynamic rounding mode control value when the instruction is not the first dedicated instruction and the rounding mode specified by the two-bit field of the instruction is the dynamic override.

11. The processor of claim 10 in which the first dedicated instruction is an instruction to round a floating point number to integer format.

12. A computer system comprising:

a storage area configured to store therein a dynamic rounding mode control value;

a bus coupled to said storage area; and a processor, coupled to said bus, configured to execute an instruction using a first predetermined rounding mode when the instruction is a first predetermined instruction, said processor further configured to execute the instruction using a rounding mode specified by the instruction when the instruction is not the first predetermined instruction and the rounding mode specified by the instruction is not a dynamic override, said circuit further configured to execute the instruction using a rounding mode specified by the dynamic rounding mode control value when the instruction is not the first predetermined instruction and the rounding mode specified by the instruction is the dynamic override.

13. The computer system of claim 12 in which the first predetermined instruction is an instruction to round a floating point number to integer format.

14. The computer system of claim 12 wherein said storage area consists of a random access memory, a cache memory, or a register file.

15. The computer system of claim 12 in which the rounding mode is specified by the instruction using two bits.

16. A computer system comprising:

storage means capable of storing therein a dynamic rounding mode control value;

bus means coupled to said storage means; and processing means, coupled to said bus means, configured to executing an instruction using a first predetermined rounding mode when the instruction is a first predetermined instruction, said execution means further configured to execute the instruction using a rounding mode specified by a two-bit field of the instruction when the instruction is not the first predetermined instruction and the rounding mode specified by the two-bit field of the instruction is not a dynamic override, said execution means further configured for executing the instruction using a rounding mode specified by the dynamic rounding mode control value when the instruction is not the first predetermined instruction and the rounding mode specified by the two-bit field of the instruction is the dynamic override.

17. The computer system of claim 16 in which the first predetermined instruction is an instruction to round a floating point number to integer format.

18. In a computer system having a dynamic rounding mode control value, a method for selecting the rounding mode for an instruction, the instruction having a static rounding control mode field, the method comprising the steps of:

A) determining if the instruction is a first instruction to convert a floating point number to an integer value;

B) selecting a first predetermined rounding mode as a selected rounding mode when the instruction is the first instruction;

C) when the instruction is not the first instruction:

i) examining the static rounding control mode field of the instruction;

ii) when the static rounding control mode field of the instruction specifies a dynamic override value, selecting a rounding mode specified by the dynamic rounding mode control value as the selected rounding mode; and iii) when the static rounding control mode field does not specify a dynamic override value, selecting a rounding mode specified by the static rounding control mode field as the selected rounding mode.

19. The method of claim 18 in which the first predetermined instruction is an instruction to round a floating point number to integer format.

* * * * *